United States Patent [19]

Moriel

[11] Patent Number: 5,263,788
[45] Date of Patent: Nov. 23, 1993

[54] FASTENING DEVICE FOR A BODY

[75] Inventor: Walter Moriel, Wattens/Tirol, Austria

[73] Assignee: D. Swarovski & Co., Wattens, Austria

[21] Appl. No.: 859,121

[22] Filed: Mar. 27, 1992

[30] Foreign Application Priority Data

Apr. 22, 1991 [DE] Fed. Rep. of Germany ....... 4113099

[51] Int. Cl.⁵ .............................. F21V 3/00; F16B 2/00
[52] U.S. Cl. ..................................... 403/329; 403/290; 362/363
[58] Field of Search ............... 403/290, 338, 316, 315, 403/289, 329; 285/81, 86, 319; 362/147, 404, 365, 363, 362, 808, 809, 806, 364

[56] References Cited

U.S. PATENT DOCUMENTS

| | | | |
|---|---|---|---|
| 1,611,553 | 12/1926 | Oliver | 362/363 |
| 1,931,343 | 10/1933 | Cook | 362/365 |
| 2,339,385 | 1/1944 | Dupler | 362/363 |
| 3,169,030 | 2/1965 | Lippincott | 285/86 |
| 4,300,851 | 11/1981 | Thelander | 403/290 X |
| 4,541,140 | 9/1985 | Allison | 403/290 X |
| 4,754,383 | 6/1988 | Klaus | 362/363 |
| 4,836,580 | 6/1989 | Farrell | 285/319 |
| 5,020,932 | 6/1991 | Boyd | 403/289 X |

FOREIGN PATENT DOCUMENTS 2620090 2/1988 France .

Primary Examiner—Randolph A. Reese
Assistant Examiner—Anthony Knight
Attorney, Agent, or Firm—Fay, Sharpe, Beall, Fagan, Minnich & McKee

[57] ABSTRACT

The invention relates to a fastening device for a transparent body, in particular a glass body for lighting purposes. This fastening device comprises an outer sleeve and a displaceable inner sleeve fitting therein. The outer sleeve contains circumferentially movable tongues with snap-in projections which can snap into depressions provided in a recess in the transparent body. Inner sleeve 2 serves to fix the tongues or snap-in projections in the depression.

8 Claims, 2 Drawing Sheets

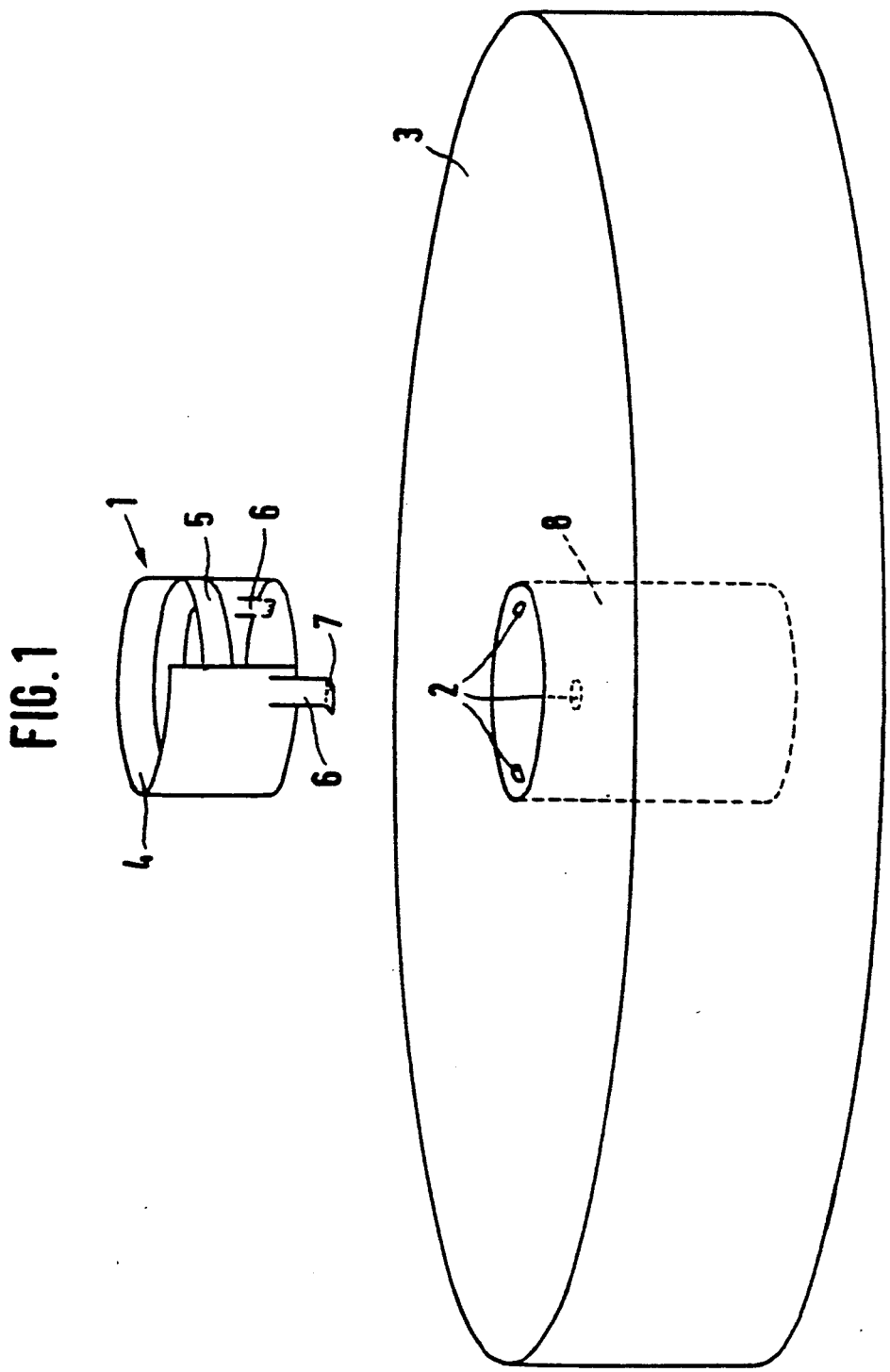

FASTENING DEVICE FOR A BODY

The present invention relates to a fastening device for a body. A body refers here to a decorative part for lighting fixtures, in particular a transparent body.

Fastening devices for a great variety of objects are known in all fields of technology. For example, DE-AS 20 29 275 discloses a device for fastening an optical block in a recess in a vehicle chassis. This device includes a fastening portion comprising a sleeve having radially movable tongues with snap-in projections which engage snap-in units provided in the recess in the body when the sleeve is introduced into the recess. However, in this device the movable tongues are not sufficiently secured, i.e. fixed in position.

Transparent bodies, in particular glass bodies, are frequently used in conjunction with lighting fixtures, for example a great variety of forms of chandelier pendants. For fastening the transparent bodies it is necessary to provide them with a mounting portion. The transparent part was fastened hitherto to an otherwise any-shaped fastening portion for example by means of a through bore via which the transparent part was suspended, or by a threaded bolt screwed into a blind hole. If the transparent parts are made of glass or lead crystal it is difficult or sometimes even impossible to fasten them by means of threaded rods passing through them or screwed into a blind hole due to problems of production engineering. Through bores or screwed threaded rods furthermore impair the general esthetic impression of the transparent body.

The present invention is based on the problem of providing a fastening device for a body, in particular a transparent body, which is easy and inexpensive to produce and easy to handle and which optimally takes account of both optical and safety aspects.

The present invention is based on the finding that this problem can be solved by interconnecting the transparent bodies and the fastening portion positively and non-positively.

The object of the present invention is a fastening device for a body characterized by a fastening portion comprising an outer sleeve and an axially displaceable inner sleeve fitting therein, whereby the outer sleeve contains radially movable tongues with snap-in projections which, upon introduction of the outer sleeve into a recess in the body, engage snap-in units which are provided in the recess and are secured by means of the inner sleeve.

The fastening device of the present invention is characterized by an extremely simple mechanics which is furthermore hardly disturbing from an optical viewpoint. It is also very advantageous in terms of safety since the transparent body can be connected with the fastening portion without gluing the two parts together. Since the movable tongues snap into the snap-in units provided in the recess in the transparent body one obtains a simple bond between the fastening portion and the transparent body, which is furthermore additionally secured by the pressure of the inner sleeve. The fastening device of the present invention permits simple production of the transparent parts; in particular it is unnecessary to drill threads or the like and to use glue.

Preferred embodiments of the present invention are found in the subclaims.

It is expedient to make the sleeves of the fastening device out of metal. In this embodiment one can expect a long life of the fastening portion. Furthermore, one can assume that metal is a material with very high elasticity, permitting a particularly reliable bond between the transparent body and sleeve portion.

At least two tongues with snap-in projections are provided in a suitable way on the outer sleeve. The more tongues are provided the more intimate the bond with the transparent body is.

In a further preferred embodiment the tongues are cut into the outer sleeve. This embodiment permits particularly simple production of the sleeve system. However, it is also possible to glue or solder the tongues to the outside wall of the sleeve.

The tongues can be suitably designed so as to protrude beyond the lower edge of the sleeve. This permits easy introduction of the sleeve into the recess and in particular simplifies the engagement of the snap-in projections with the tongues.

In a much preferred embodiment of the present invention the tongues with snap-in projections are prestressed so that they snap into the snap-in units provided in the recesses automatically and more easily.

The recess in the transparent body can optionally and preferably be a through bore or, just as preferably, a so-called blind bore.

According to the invention the snap-in units are designed as depressions in the wall of the recess. Such depressions can be easily milled.

In the following the invention shall be explained in more detail with reference to drawings, in which:

FIG. 1 shows a schematic overall view of the present invention;

Figure 2A:
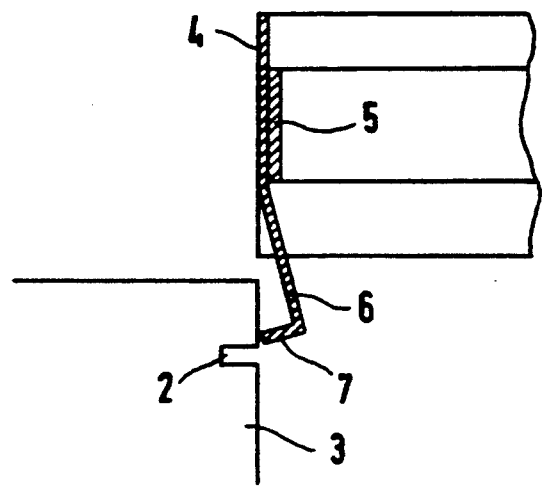
FIGS. 2a and 2b show partly cross-sectional views of the inventive fastening device, FIG. 2a) shows the detached state, and FIG. 2b) shows the engaged state.

FIG. 1 shows fastening portion 1 together with transparent body 3. Outer sleeve 4 of the fastening body shows tongues 6 provided thereon and their snap-in projections 7. This sleeve contains inner sleeve 5 fitting closely under pressure. Transparent body 3 contains a cylindrical recess 8 having in its upper section depressions 2 for taking up snap-in projections 7. In the shown embodiment both recess 8 and sleeves 4 and 5 have a cylindrical shape. However, the fastening device is not confined to this shape but allows for all possible geometrical forms. Inner sleeve 5 can have the same dimensions as outer sleeve 4 but can be designed substantially as a ring, as shown. The essential point is that it can exert a pressure on outer sleeve 4 in the area of tongues 6 so as to prevent tongues 6 or snap-in projections 7 from jumping out of depressions 2 in recess 8.

Sleeves 4 and 5 are preferably made of metal, but one can also use a great variety of plastics materials having sufficient strength.

The transparent body can likewise be made of plastics, for example Plexiglas, but is preferably made of glass or lead crystal. To improve the esthetic effect it is expedient to mirror-coat the inside wall of recess 8. This prevents sleeve portion 4 introduced into the transparent body from being perceived as disturbing by the viewer. Sleeve portion 4 can alternatively be nickel-plated or chrome-plated.

Figure 2B:
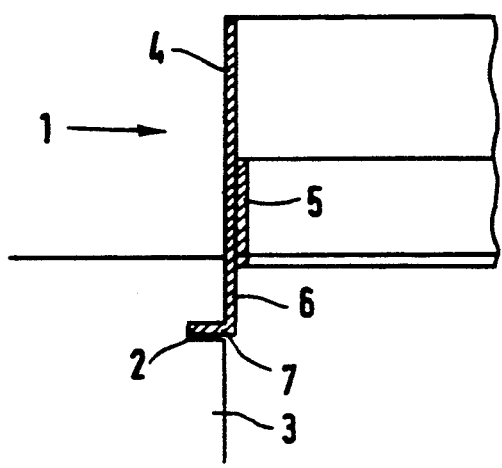

FIGS. 2a and 2b show how the bond between sleeves 4 and 5 and transparent body 3 is produced.

FIGS. 2a and 2b again show outer sleeve 4, inner sleeve 5 fitting closely therein and a tongue 6 with snap-in projection 7 provided in the outer sleeve. One also sees a schematic section through transparent body 3 wherein a depression 2 is milled in the upper area. To connect fastening portion 1 with transparent body 3 one introduces outer sleeve 6 into recess 8 in transparent body 3, causing movable tongue 6 to bend back and snap-in projection 7 to snap into depression 2 upon reaching it. To fix tongue 6 or snap-in projection 7 in depression 2 one pushes inner sleeve 5 downward so that it presses tongue 6 firmly against the inside wall of recess 8. Inner sleeve 5 can thereby sit close in the total area of tongues 6. Depression 2 for taking up snap-in projections 7 can also be made deeper than shown. Outer sleeve 4 together with inner sleeve 5 can also optionally be completely sunk in recess 8 in the transparent body.

The inventive fastening device permits a simple and reliable bond between the transparent body and the fastening portion. It offers optical and safety-related advantages.

To prevent the transparent body from being damaged during heating due to the different coefficients of expansion of the material of the transparent body and the material of sleeves 4, 5, one preferably uses sleeves with corresponding tolerances or sleeves having a slot along the surface area of the cylinder.

I claim:

1. A fastening device for suspending a transparent body (3) comprising a fastening portion (1) having an outer sleeve (4) and an axially displaceable inner sleeve (5) fitting therein, interconnected with the transparent body (3), which has a recess having snap-in units (2), whereby the outer sleeve (4) contains radially movable tongues (6) with snap-in projections (7) which, upon introduction of the outer sleeve (4) into the recess (8) of the transparent body (3), engage the snap-in units (2), the snap-in projections (7) being secured by means of the inner sleeve (5).

2. The fastening device of claim 1, characterized in that the sleeves (4, 5) are made of metal.

3. The fastening device of claim 1, characterized in that at least two tongues (6) with snap-in projections (7) are provided on the outer sleeve (4).

4. The fastening device of claim 1, characterized in that the tongues (6) are cut into the outer sleeve (4).

5. The fastening device of claim 1, characterized in that the tongues (6) protrude beyond the lower edge of the sleeve (4).

6. The fastening device of claim 1, characterized in that the recess (8) is a through bore.

7. The fastening device of claim 1, characterized in that the recess (8) is a blind bore.

8. The fastening device of claim 1, characterized in that the snap-in units (2) are provided as depressions in the wall of the recess (8).

* * * * *